July 10, 1956
F. S. PEARNE
2,753,924
FLUID PRESSURE ACTUATED TIRE BEAD BREAKER
WITH OPPOSED PRESSURE ELEMENTS
Filed April 18, 1955
2 Sheets-Sheet 1
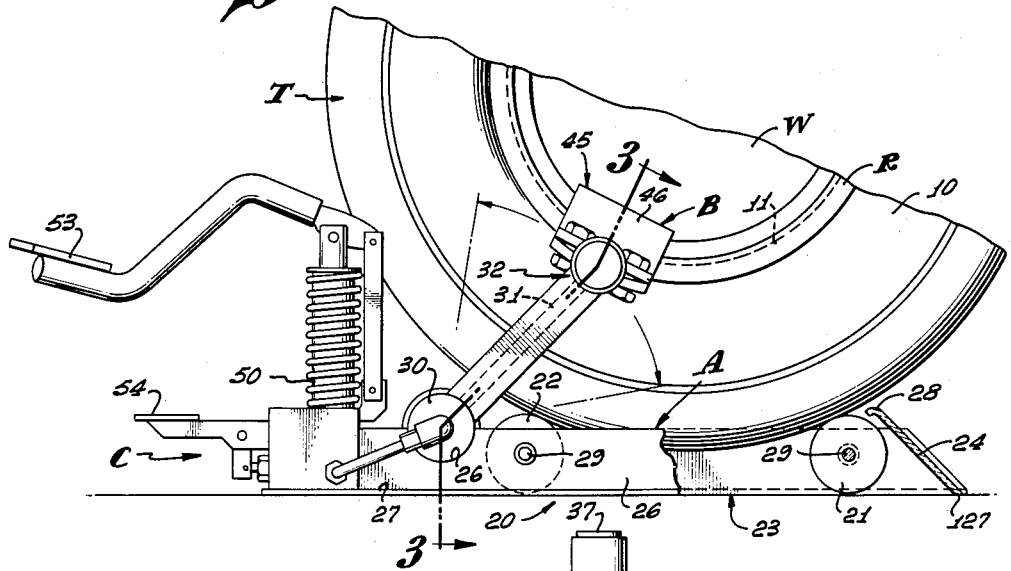
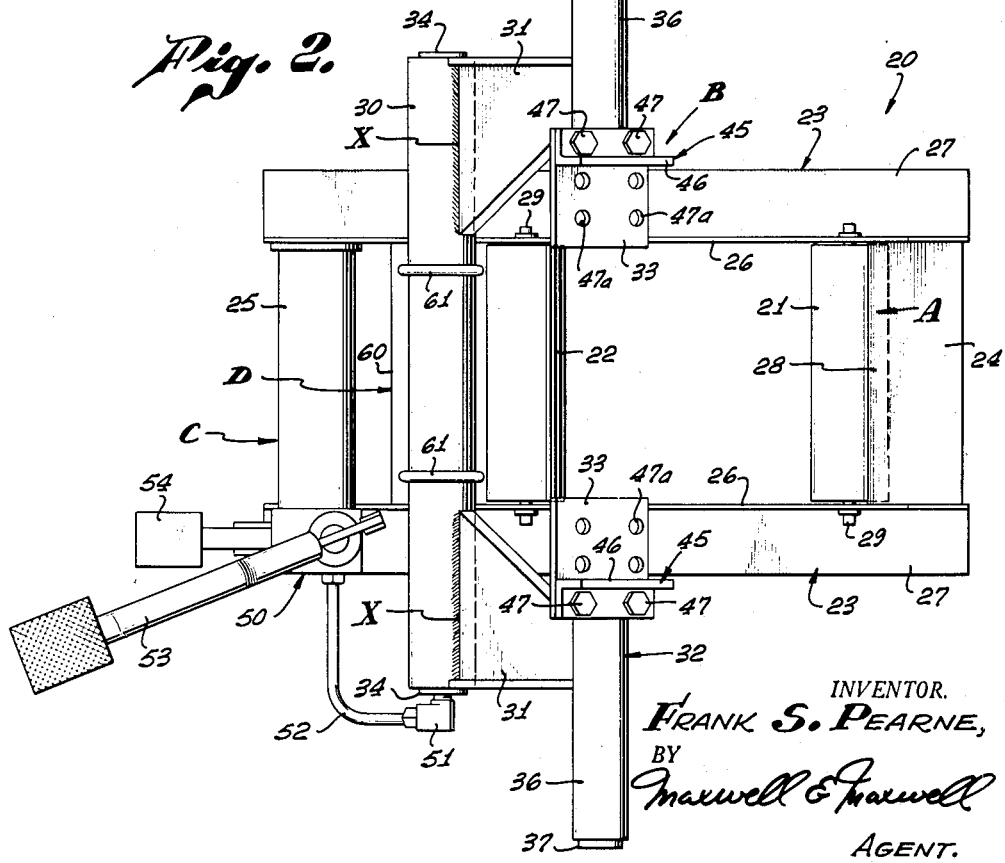
INVENTOR.
FRANK S. PEARNE,
BY
Maxwell & Maxwell
AGENT.

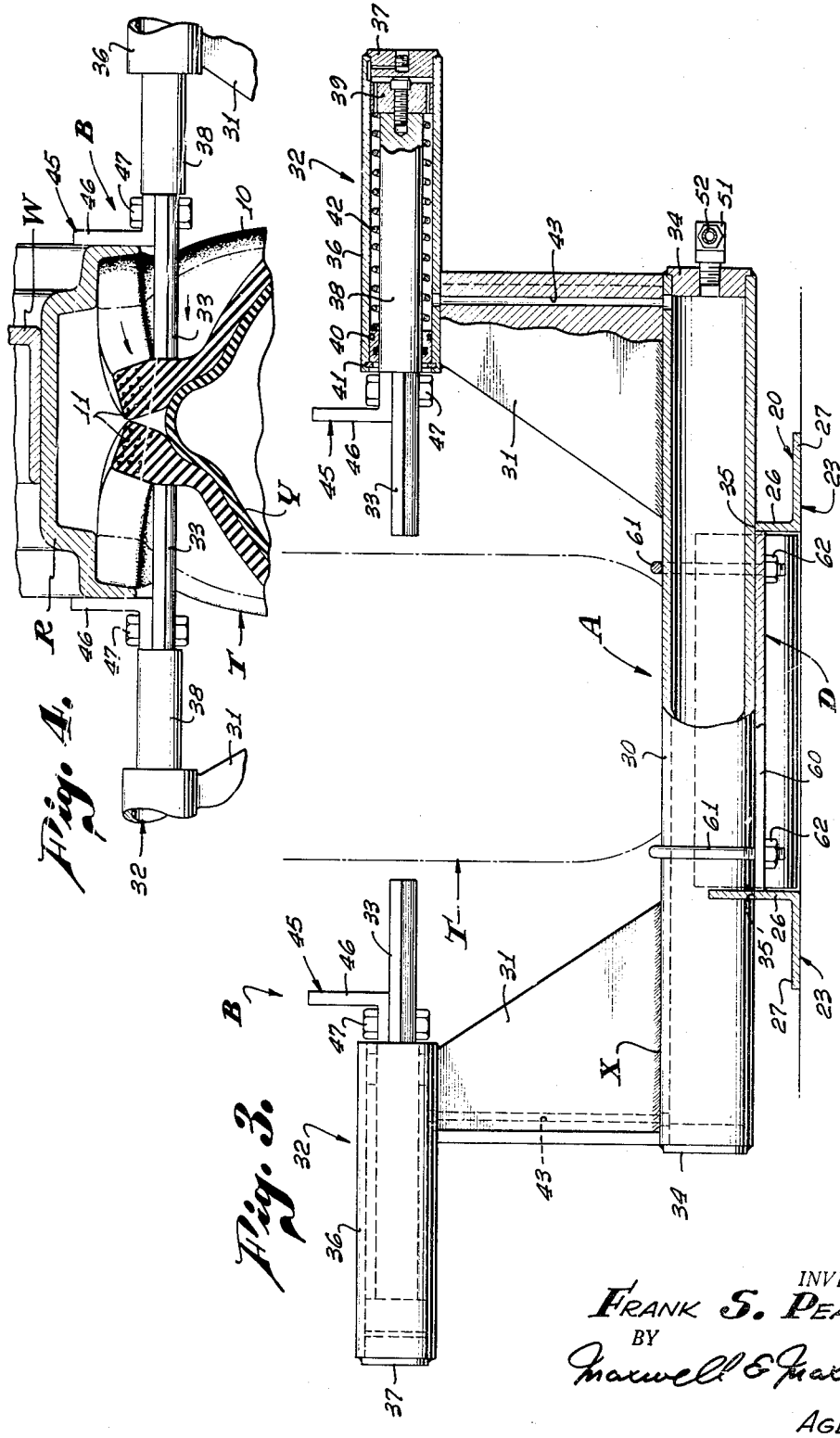

United States Patent Office 2,753,924
Patented July 10, 1956

2,753,924

FLUID PRESSURE ACTUATED TIRE BEAD BREAKER WITH OPPOSED PRESSURE ELEMENTS

Frank S. Pearne, Los Angeles, Calif., assignor to Regent Jack Mfg. Co., Inc., Downey, Calif., a corporation of California Application April 18, 1955, Serial No. 502,033

9 Claims. (Cl. 157—1.28)

This invention relates to a machine for handling pneumatic tires, and is more particularly concerned with a machine adapted to break loose, or free the inner peripheral beads of pneumatic tire casings away from the rims of the wheels on which the casings are engaged, and might best be referred to as a bead breaker.

It is a general object of the present invention to provide a bead breaker of the character referred to above, having a pair of axially spaced, opposed ram units that operate to simultaneously engage a tire casing at the opposite sides thereof to compress the casing and break the beads thereof free from the rim of the wheel on which the tire casing is engaged.

Another object of the present invention is to provide a bead breaker of the character referred to onto which a tire and wheel can be rolled and which rotatably supports the tire and wheel when the structure is in operation and the tire and wheel are being worked upon.

A further object of the present invention is to provide a machine for freeing the beads of tire casings from the rims of wheels which is hydraulically operated and such that it can be adjusted to work on tires and wheels of various sizes.

Still another object of the present invention is to provide a bead breaker of the character referred to which is neat and compact and which is free of unsightly and dangerous or hazardous parts and projections.

Another object of the invention is to provide a machine that is easy and economical of manufacture and which requires little effort and/or skill to operate and maintain.

The various objects and features of my invention will be fully understood from the following detailed description of a typical preferred form and application of my invention, thoughout which description reference is made to the accompanying drawings, in which:

Fig. 1 is a side elevational view of the structure that I provide and showing a tire and wheel engaged therein. Fig. 2 is an elevational plan view of the structure shown in Fig. 1 with the tire and wheel removed. Fig. 3 is an enlarged detailed sectional view taken substantially as indicated by line 3—3 on Fig. 1 and showing certain of the parts and portions thereof in elevation. Fig. 4 is an enlarged detailed sectional view of a part of my construction showing the beads of a tire being urged out of engagement from the rim of a wheel.

In Fig. 1 and 4 of the drawings, I have shown a tire T and wheel W in working engagement with my new bead breaker machine. The tire T and wheel W is shown as a conventional type pneumatic tire and wheel assembly such as might be employed on automobiles, trucks, airplanes and the like.

The tire T is shown as including an annular, radially inwardly opening, substantially semi-circular casing 10, with axially spaced annular rim engaging beads 11 formed about its peripheral edges, and a separable inner tube Y engaged within the casing 10 and adopted to be filled with air to establish a pneumatic cushion within the casing and to maintain the casing in proper working configuration.

The wheel W is shown as a simple disc-shaped wheel and is provided about its outer periphery with a suitable drop center rim R adapted to receive the casing 10 of the tire T to embrace and hold the beads 11 of the casing. The rim R also serves to close the inner periphery of the casing and to maintain the tube Y engaged therein.

The structure that I provide is adapted to receive a tire and wheel, such as the tire T and wheel W referred to above, and to selectively engage and compress the tire casing 10 to break the beads 11 thereon away from from the rim R of the wheel W, in the manner clearly illustrated in Fig. 4 of the drawings.

The structure of the present invention is shown as including generally, a support means A adapted to freely receive and rotatably support the wheel W and tire T, clamp means B shiftably carried by the support means A and adapted to engage the opposite sides of the tire T, adjacent the rim R of the wheel W, to break the tire free from the rim, and hydraulic actuating means C adapted to operate the clamping means B.

The support means A is shown as including, an elongate horizontally disposed base frame 20 having front and rear ends, and a pair of longitudinally spaced, horizontally disposed, support rollers 21 and 22 extending transverse the frame and adapted to rotatably engage and support the tire and wheel assembly.

The base frame 20 is shown as being established by a pair of like parallel longitudinal side rails 23 and horizontally disposed front and rear spacer members 24 and 25 fixed to and extending between the ends of the side rails. The side rails 23 are shown as being formed of simple angle iron stock and arranged so that each rail has an upwardly projecting longitudinal side wall 26 and a laterally outwardly projecting longitudinal floor, or ground engaging base 27.

The front spacer member 24 is a simple flat plate-like part and is arranged between the forward terminal ends of the side rail 23 so that it is rearwardly upwardly inclined and establishes a suitable ramp to facilitate rolling of the tire T onto the support rollers 21 and 22. In the particular case illustrated, the front spacer or ramp 24 has a lower edge 127 adapted to occur along the floor or ground and an upper edge portion 28 which projects above the side walls 26 of the side rails 23 and overlies the forward portion of the front roller 21.

The rear spacer member 25 is adapted to extend between the rear ends of the side rails 23 of the base, to hold the rails in fixed parallel relationship. In the particular case illustrated the rear spacer 25 is in the form of an elongate cylindrical reservoir adapted to carry a supply of hydraulic fluid for the actuating means C, and will hereinafter be referred to as the reservoir 25.

The front and rear support rollers 21 and 22 are simple, like, longitudinally spaced parallel cylindrical members extending transverse of the frame, between the side rails 23 thereof. The rollers 21 and 22 are each provided with central axles or supporting shafts 29 which project from the ends thereof and through suitable bearing openings in the walls 26 of the side rails to be supported thereby.

The clamping means B that I provide, is shown as including an elongate manifold beam 30 extending transverse of and rotatably carried by the frame 20, like parallel arms 31 projecting laterally from the ends of the manifold beam 30, like oppositely disposed axially aligned hydraulic ram units 32 at the outer ends of the arms, and tire engagiing heads 33 carried by the ram units 32 and adapted to engage the tire casing 10 and urge the beads 11 of the casing out of engagement with the rim R of the wheel W.

The manifold beam 30 extending transverse of the frame 20 is a simple cylindrical member formed of a length of pipe and has its ends closed by means of suitable plugs 34. The manifold beam 30 is located rearwardly of the rear support roller 22 and is rotatably engaged in and supported by arcuate recesses 35 entering the upper edges of the side walls 26 of the rails of the frame 20.

The arms 31 of the clamp means B are simple, flat plate-like parts fixed to the opposite end portions of the manifold beam, as by welding X, to project radially outwardly therefrom and in parallel relationship to each other.

The ram unit 32 at the outer end of each arm 31 is shown as including an elongate cylinder 36 fixed to the outer end of the arm 31, with its central longitudinal axis spaced above and extending transverse of the frame, a plug 37 closing one end of the cylinder, a ported head 39 secured to the inner end of the ram to slidably engage the wall of the cylinder and support the ram in the cylinder, a sealing ring 40 in the said other end portion of the cylinder and surrounding the ram to seal therewith, a keeper ring 41 engaged in the cylinder 36 and adapted to maintain the sealing ring engaged therein. Each ram unit 32 is shown as being further provided with a compression spring 42 engaged around the ram rod 38 to occur between the head 39 on the ram and the sealing ring 40, and adapted to normally yieldingly urge the ram into the cylinder 36.

In the particular case illustrated the ram units 32 are hydraulically operated and are actuated simultaneously by fluid pressure from within the manifold beam 30.

In the preferred carrying out of the invention, a fluid transfer duct 43 is provided in each arm 31 to communicate with suitable flow unit cylinders 36. With this relationship of parts, the ram cylinders 36 are in open communication with the manifold beam 30 at all times, with the result that as fluid is introduced into the manifold beam, the ram units 32 are actuated, that is, the ram rods 38 are urged out of the cylinders 36 and towards each other. When fluid is withdrawn, from the manifold beam, or is bled off, the rams are drawn and/or urged into the cylinders 36 by the displacement of fluid and by the action of the compression springs 42.

The tire engaging heads 33 are simple, rectangular plate-like parts secured to the outer opposed ends of the ram rods 38 by welding, or the like. In the case illustrated, the heads 32 are shown as being curved, so that they conform, substantially, to the rim diameter, and are adapted to engage on opposite sides of the tire casing 10, adjacent the rim R of the wheel W.

The clamp means B is shown as being further provided with a suitable stop means 45 on each head 33, which means is adapted to engage the rim R of the wheel W and limit the movement of the head 33 should the tire bead, engaged by that head, break loose before the bead engaged by the other head breaks loose. The stop means further limits movement of the heads 33 towards each other and thereby prevents the head 33 from pinching and injuring the tire casing 10. The stop means 45 is shown as being established by a simple piece of angle iron 46 fixed to each tire engaging head 33 by means of suitable bolt fasteners 47, to establish a laterally projecting rim engaging flange on each of the heads 33.

In the form of the invention illustrated, the heads 33 are shown as being provided with a plurality of longitudinally and laterally spaced openings 47a, adapted to receive the bolt fastener 47 of the stop means 45. Through this relationship of parts, it will be apparent that the stop means 45 can be set in various positions on the heads 33 to properly engage tires and rims of varying sizes.

The hydraulic actuating means C adapted to operate the clamping means B is shown as including a suitable hydraulic pump 50 carried by one of the side rails 23 of the frame 20, at the rear end thereof. The pump 50 is adapted to be connected with the reservoir 25 and in the particular case illustrated, is shown as being located at one end of the reservoir to be in open communication therewith.

A suitable fluid handling swivel fitting 51 is engaged in the plug 34 at the end of the manifold beam 30, next to which the pump 50 occurs, and a fluid conducting tube 52 is provided to extend between and connect with the pump and the swivel fitting, to conduct fluid between the manifold beam and the pump.

In the particular case illustrated the pump 50 is shown as being provided with a suitable operating pedal 53 to be engaged by the operator's foot to pump fluid from the reservoir 25 into the manifold beam 30. The pump 50 is also shown as being provided with a suitable pedal 54 connected to a relief valve in the pump and adapted to be engaged by the operator's foot to permit the fluid within the manifold beam 30 to flow back through the pump and into the reservoir.

With the structure thus far described, it will be apparent that a person can easily and quickly break the beads 11 of the tire T, free from the rim R of the wheel W, by first rolling the tire and wheel up the ramp 24 of the frame 20, into engagement with the support rollers 21 and 22, then depressing the operating pedal 53 of the actuating means C with his foot to shift the heads 33 of the clamping means B towards each other to engage the tire casing 10 and urge the beads 11 thereof away from the rim R, then depressing the relief pedal 54 and permitting the heads 33 to move apart, and out of engagement with the tire, then rotating the tire on the support rollers, to a new position and then again actuating and releasing the clamp means in the manner set forth above, and so on until the beads 11 on the tire casing 10 are free from the rim R of the wheel, about their entire peripheral extent, whereupon the tire and wheel can be rolled off of the support rollers 21 and 22 and down the ramp of the frame.

It is to be noted that, at no time, does the person operating my device have to lay down, or pick up the tire and wheel, but need only roll it onto the support means and relative to the clamping means. It is also to be noted that the operator of my device need not remove his hands from the tire and wheel and can actuate and release the mechaenism with one foot.

In the form of the invention illustrated, the manifold beam 30 is held in position on the frame 20 by a suitable holding means D. The holding means D is shown as including a suitable anchor bar 60 secured to and extending between the side rails 23 of the frame, below the manifold beam, and a pair of laterally spaced U-bolts 61 engaged through and carried by the anchor bar 60 and engaged around the mnifold beam 30. Suitable nuts 62 are threadably engaged on the U-bolts 61 to occur at the underside of the anchor bar and are adapted, when tightened, to draw the manifold beam 30 downwardly and into tight frictional engagement with the frame 10. In practice, the manifold beam 30 is held sufficiently tight on the frame to prevent free relative movement or rotation of the beam, relative to the frame, but not so tight as to prevent the operator of the device from manually shifting and rotating the clamp means relative to the frame.

It will be apparent that by rotating the clamp means B relative to the support means A, the relative position of the ram units 32 of the clamp means to the support rollers 21 and 22 is varied, with the result that a mechanism can be easily and quickly adjusted to handle tires and wheels of various sizes. It will also be apparent that when the clamp means B is rotated or adjusted to accommodate a tire and wheel of a particular size, the flat plate-like heads 33 of the ram units can be adjusted so that they establish proper engagement with the tire T and the rim R by rotating the heads and the rams relative to the ram cylinders 36.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A bead breaker of the character referred to including, support means adapted to receive and rotatably support a tire and wheel, clamping means related to the support means and adapted to engage and compress the tire to break the beads of the tire free from the rim of the wheel, and hydraulic actuating means connected with and adapted to operate the clamping means, the supporting means including an elongate horizontally disposed frame with parallel side rails, and a pair of elongate tire supporting rollers extending between and supported by the side rails, the clamping means including, an elongate beam supported by and extending transverse the side rails of the frame, arms projecting from the ends of the beam to occur at and overlie the opposite sides of the tire, and hydraulic rams at the ends of the arms and adapted to be shifted into engagement with the tire and connected with actuating means.

2. A bead breaker of the character referred to including, support means adapted to receive and rotatably support a tire and wheel, clamping means related to the support means and adapted to engage and compress the tire to break the beads of the tire free from the rim of the wheel, and hydraulic actuating means connected with and adapted to operate the clamping means, the supporting means including an elongate horizontally disposed frame with parallel side rails, and a pair of elongate tire supporting rollers extending between and supported by the side rails, the clamping means including, an elongate beam supported by and extending transverse the side rails of the frame, arms projecting from the ends of the beam to occur at and overlie the opposite sides of the tire, and hydraulic rams at the ends of the arms and adapted to be shifted into engagement with the tire and connected with actuating means, the clamping means being pivotally carried by the support means and adapted to swing relative thereto to cooperatively engage tires and wheels of varying size.

3. A bead breaker of the character referred to including, support means adapted to receive and rotatably support a tire and wheel, clamping means related to the support means and adapted to engage and compress the tire to break the beads of the tire free from the rim of the wheel, and hydraulic actuating means connected with and adapted to operate the clamping means, the supporting means including an elongate horizontally disposed frame, with parallel side rails, and a pair of elongate tire supporting rollers extending between and supported by the side rails, the clamping means including, an elongate beam supported by and extending transverse the side rails of the frame, arms projecting from the ends of the beam to occur at and overlie the opposite sides of the tire, and hydraulic rams at the ends of the arms and adapted to be shifted into engagement with the tire and connected with the actuating means, the actuating means including, an oil reservoir in the frame, a hydraulic pump carried by the frame in communication with the reservoir and a liquid conduit from the pump to the clamping means.

4. A bead breaker of the character referred to including, support means adapted to receive and rotatably support a tire and wheel, clamping means related to the support means and adapted to engage and compress the tire to break the beads of the tire free from the rim of the wheel, and hydraulic actuating means connected with and adapted to operate the clamping means, the supporting means including an elongate horizontally disposed frame with parallel longitudinal side rails, and a flat rearwardly and upwardly inclined spacer extending between the front ends of the side rails and establishing a ramp, and a cylindrical spacer extending between the rear ends of the side rails and establishing an oil reservoir, and front and rear tire supporting rollers extending transverse the frame between the ramp and the reservoir and rotatably supported by the side rails, the front roller being located adjacent the ramp with its forward portion beneath the ramp, the actuating means including, a manually operated hydraulic pump carried by the frame in communication with the reservoir and a liquid conduit from the pump to the clamping means.

5. A bead breaker of the character referred to including, support means adapted to receive and rotatably support a tire and wheel, clamping means related to the support means and adapted to engage and compress the tire to break the beads of the tire free from the rim of the wheel, and hydraulic actuating means connected with and adapted to operate the clamping means, the supporting means including an elongate horizontally disposed frame with parallel longitudinal side rails, and a flat rearwardly and upwardly inclined spacer extending between the front ends of the side rails and establishing a ramp, and a cylindrical spacer extending between the rear ends of the side rails and establishing an oil reservoir and front and rear tire supporting rollers extending transverse the frame between the ramp and the reservoir and rotatably supported by the side rails, the clamping means including an elongate fluid handling manifold beam extending transverse of the frame, and rotatably supported by the side rails, a fluid connection between said manifold and said reservoir, a pair of like parallel arms projecting laterally from the ends of the beam to occur at and overlie the opposite sides of the tire on the supporting rollers, opposed axially aligned hydraulic ram uints at the ends of the arms, a fluid connection between each ram unit and the manifold beam, and a tire engaging head carried by each ram unit and adapted to be shifted into engagement with the tire by the ram unit.

6. A bead breaker of the character referred to including, support means adapted to receive and rotatably support a tire and wheel, clamping means related to the support means and adapted to engage and compress the tire to break the beads of the tire free from the rim of the wheel, and hydraulic actuating means connected with and adapted to operate the clamping means, the supporting means including an elongate horizontally disposed frame with parallel longitudinal side rails, and a flat rearwardly and upwardly inclined spacer extending between the front ends of the side rails and establishing a ramp, and a cylindrical spacer extending between the rear ends of the side rails and establishing an oil reservoir and front and rear tire supporting rollers extending transverse the frame between the ramp and the reservoir and rotatably supported by the side rails, the clamping means including an elongate fluid handling manifold beam extending transverse of the frame, and rotatably supported by the side rails, a fluid connection between said manifold and said reservoir, a pair of like parallel arms projecting laterally from the ends of the beam to occur at and overlie the opposite sides of the tire on the supporting rollers, opposed axially aligned hydraulic ram units at the ends of the arms, a fluid connection between each ram unit and the manifold beam, and a tire engaging head carried by each ram unit and adapted to be shifted into engagement with the tire by the ram unit, the front roller being located adjacent the ramp with its forward portion beneath the ramp, the actuating means including, a manually operated hydraulic pump carried by the frame in communication with the reservoir and a liquid conduit from the pump to the manifold of the clamping means.

7. A bead breaker of the character referred to including, support means adapted to receive and rotatably support a tire and wheel, clamping means related to the support means and adapted to engage and compress the tire to break the beads of the tire free from the rim of the wheel, and hydraullic actuating means connected with and adapted to operate the clamping means, the supporting means including, an elongate horizontally disposed frame with parallel longitudinal side rails, and a flat rearwardly and upwardly inclined spacer extending between the front ends of the side rails and establishing a ramp, and a cylindrical spacer extending between the rear ends of the side rails and establishing an oil reservoir, and front and rear tire supporting rollers extending transverse the frame between the ramp and the reservoir and rotatably supported by the side rails, the clamping means including an elongate fluid handling manifold beam with a fluid fitting extending transverse of the frame, and rotatably supported by the side rails, a fluid connection between said manifold and said reservoir, a pair of like parallel arms projecting laterally from the ends of the beam to occur at and overlie the opposite sides of the tire on the supporting rollers, opposed axially aligned hydraulic ram units at the ends of the arms, a fluid connection between each ram unit and the manifold beam, and a tire engaging head carried by each ram unit and adapted to be shifted into engagement with the tire by the ram unit, the actuating means including, a hydraulic pump carried by a side rail of the frame adjacent to and in communication with the reservoir, an operating pedal on the pump, a relief pedal on the pump, a fluid handling swivel connection at one end of the manifold beam, and a fluid handling line from the pump to the fitting.

8. A bead breaker of the character referred to including, a support means adapted to receive and rotatably support a tire and wheel, clamping means related to the support means and adapted to engage and compress the tire to break the beads of the tire free from the rim of the wheel, and hydraulic actuating means connected with and adapted to operate the clamping means, the supporting means including an elongate horizontally disposed frame with parallel longitudinal side rails, and a flat rearwardly and upwardly inclined spacer extending between the front ends of the side rails and establishing a ramp, and a cylindrical spacer extending between the rear ends of the side rails and establishing an oil reservoir, and front and rear tire supporting rollers extending transverse the frame between the ramp and the reservoir and rotably supported by the side rails, a fluid connection between said manifold and said reservoir, the clamping means including an elongate fluid handling manifold beam with a fluid fitting at one end extending transverse of the frame, rearward of the rear support roller, holding means carried by the frame to maintain the beam on the frame, a pair of like parallel arms projecting laterally from the ends of the beam to occur at and overlie the opposite sides of the tire on the supporting rollers, opposed axially aligned hydraulic ram units at the ends of the arms, a fluid connection between each ram unit and the manifold beam, and a tire engaging head carried by each ram unit and adapted to be shifted into engagement with the tire by the ram unit, the holding means including. aligned beam receceiving recesses in the side rails to occur below the beam, and a pair of U-bolts carried by the bar and engageable around the beam and adapted to normally prevent rotation of the beam, in the recesses, the actuating means including, a hydraulic pump carried by a side rail of the frame adjacent to and in communication with the reservoir, an operating pedal on the pump, a relief pedal on the pump, a fluid handling swivel connection at one end of the manifold beam, and a fluid handling line from the pump to the fitting.

9. A bead breaker of the character referred to including, support means adapted to receive and rotatably support a tire and wheel in a vertical plane, clamping means related to the support means and adapted to engage and compress the tire to break the beads of the tire free from the rim of the wheels, and hydraulic actuating means connected with and adapted to operate the clamping means, the supporting means including an elongate horizontally disposed frame, a pair of tire supporting rollers spaced longitudinally of and rotatably supported by the frame, the clamping means including, laterally spaced arms carried by the frame to occur at and overlie the opposite sides of the tire, and hydraulic rams at the ends of the arms and adapted to be shifted into engagement with the tire and connected with the actuating means.

References Cited in the file of this patent

UNITED STATES PATENTS

| | | |
|---|---|---|
| 2,439,135 | Johnson et al. | Apr. 6, 1948 |
| 2,439,896 | Kraft | Apr. 20, 1948 |
| 2,470,534 | Thomas | May 17, 1949 |
| 2,534,950 | Butterfield et al. | Dec. 19, 1950 |
| 2,562,995 | Watkins | Aug. 7, 1951 |
| 2,616,487 | Parks | Nov. 4, 1952 |